A. E. FREY.
SPRING SUSPENSION.
APPLICATION FILED APR. 23, 1920.
1,396,365.
Patented Nov. 8, 1921.
2 SHEETS—SHEET 1.
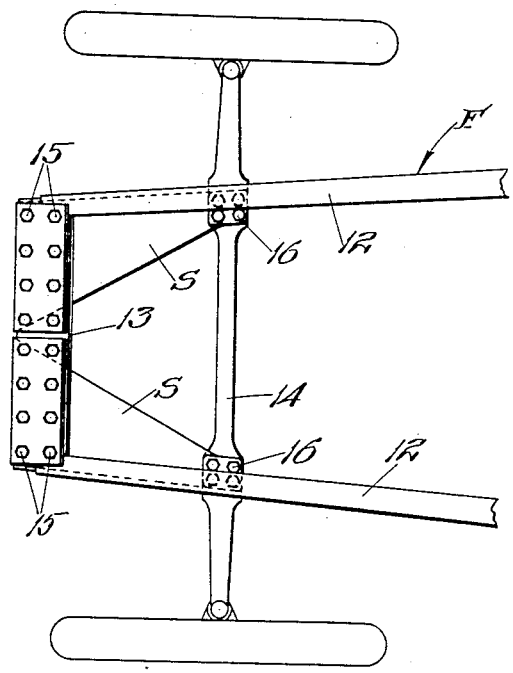
Fig_1_
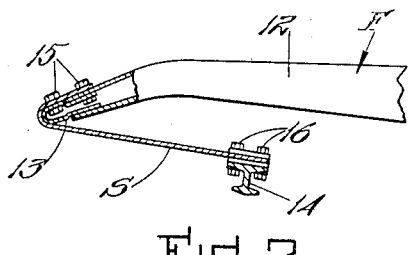
Fig_2_
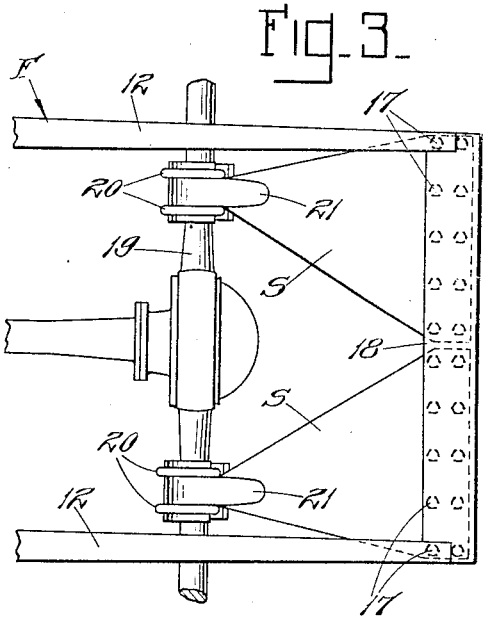
Fig_3_
Fig_4_
INVENTOR:
Albert E. Frey
by Macleod, Calver, Copeland & Dike
Attys

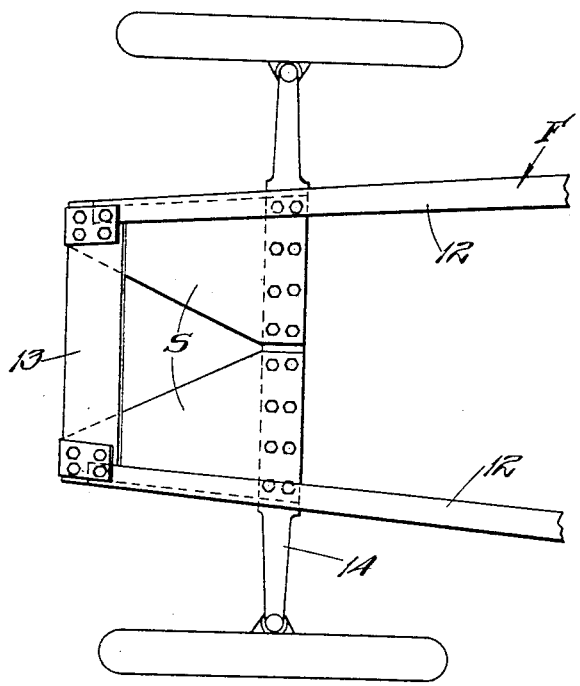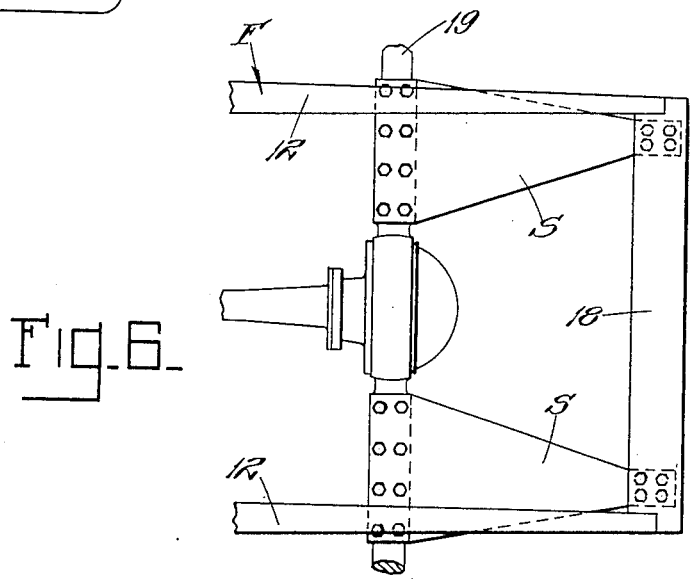

UNITED STATES PATENT OFFICE.

ALBERT E. FREY, OF DETROIT, MICHIGAN, ASSIGNOR TO ESSEX MOTORS, OF DETROIT, MICHIGAN, A CORPORATION OF MICHIGAN.

SPRING SUSPENSION.

1,396,365.  Specification of Letters Patent.  Patented Nov. 8, 1921.

Application filed April 23, 1920. Serial No. 376,117.

*To all whom it may concern:*

Be it known that I, ALBERT E. FREY, a citizen of the United States, residing at Detroit, county of Wayne, State of Michigan, have invented a certain new and useful Improvement in Spring Suspensions, of which the following is a specification, reference being had therein to the accompanying drawings.

The invention relates to a new and improved form of spring suspension for vehicles, and is especially adapted for use on motor vehicles of small or light types.

Springs now in common use on all types of automobiles are usually made up of a series of narrow leaves bound together by clips and shackled either to the frame of the car or to a member rigidly attached to the frame. These springs are not only expensive to manufacture, but require frequent attention from the owner of the car. Graphite must occasionally be inserted between the leaves, the shackle bolts must be kept well oiled, and some provision must be made for taking up wear to prevent rattling.

The object of my invention is to produce a spring suspension especially applicable to small cars of light construction, which shall be easy and inexpensive to manufacture and shall require little or no attention when once installed on the car. I accomplish this by providing a spring member made up of a single leaf of varying flexibility from end to end and which I form in the general shape of a triangle when viewed in the direction in which flexure takes place, *i. e.*, in plan when, as is usual, the flexure is in a generally vertical direction. I give it this triangular shape so that one end, which corresponds to the base of the triangle, shall have the stiffness of the ordinary form of spring composed of a series of leaves. The portion of the spring which corresponds to the apex end of the triangle would be the most yielding.

I prefer to attach the most yielding portion of the spring to the axle and the portion of greatest stiffness to the frame of the car, but I do not, however, limit myself to this construction as it might be equally effective if attached the other way around, and I have shown and described both forms and intend to claim them.

My invention does away with the difficulties and objections due to the use of a plurality of spring leaves, since there is no necessity of lubrication between the leaves, and no noise such as is produced by the movement of the leaves relatively to each other. The spring embodying my invention also lessens the side sway and can be secured in place more easily and at less expense. My improved spring also lessens the tendency of the vehicle to rebound.

The invention will be fully understood from the following description when taken in connection with the accompanying drawings, and the novel features thereof will be pointed out and clearly defined in the claims at the close of this specification.

In the drawings, Figure 1 is a plan view of the front end of an automobile chassis equipped with spring suspension embodying the invention.

Fig. 2 is a view in elevation partly broken away of the parts shown in Fig. 1.

Figs. 3 and 4 are similar views of the rear end of the chassis showing my improved spring suspension applied thereto.

Figs. 5 and 6 are plan views illustrating a different application of a spring embodying the invention.

Referring now to the drawings and particularly to Figs. 1 and 2, there is shown at F the frame of an ordinary automobile chassis equipped with my novel form of spring suspension. At 12, 12 are shown the side rails which are tied together at their forward ends by a cross member 13. At 14 is indicated the front axle.

The springs embodying the invention are shown at S and each consists of a single leaf which is generally triangular in shape as shown in plan view in Fig. 1. This leaf is installed with the base of the triangle rigidly secured to the frame member 13 by bolts 15, and the apex of the triangle rigidly secured to the axle 14 by means of bolts 16.

By the foregoing construction it will be seen that the stiffest portion of the spring is secured to the frame while the most yielding portion is secured to the axle of the car.

Referring now to Figs. 4 and 5, there is shown the application of my improved spring to the rear end of the car. In this case the spring is rigidly attached at its stiff base portion by bolts 17 to the cross member 18 of the frame of the vehicle while its yielding or apex end is rigidly attached to the rear axle.

In some cases, it may be advisable to add an extra leaf 21 for the purpose of reinforcing the main leaf at the point of greatest stress. This is especially desirable where the springs have to take the driving and braking torque, as in cars employing the Hotchkiss drive. In the drawings, I have indicated this additional leaf at 21 and have shown it attached to the rear axle 19 together with the yielding end of the spring by means of a U-shaped clamp 20.

In Figs. 5 and 6 I have shown a slightly different application of the spring, in which the stiffest portion is secured to the axle and the most yielding portion is secured to the frame of the car.

Springs like those shown and described herein are very cheap to manufacture because comprised of a single piece of metal, and because of the rigid attachment both to the axle and the frame of the vehicle do away with all possibility of rattling.

Side sway of the vehicle is also done away with both because of the rigid attachment of the spring and because the wide base of the spring resists twisting and the spring forms in effect a diagonal brace.

What I claim is:

1. A spring suspension for vehicles comprising a single integral leaf substantially triangular when viewed in the direction of the flexure and extending in the longitudinal direction of the vehicle, one end of said leaf being secured to the crossbar of the frame and the other end being secured to one of the axles.

2. A spring suspension for vehicles comprising two independent springs in the same plane, each spring being composed of a single integral leaf which is substantially triangular when viewed in the direction of the flexure, the spring extending in the longitudinal direction of the vehicle, the base and the apex of each leaf constituting its attaching ends, one end being secured to the crossbar of the frame and the other end being secured to one of the axles.

3. A spring suspension for vehicles comprising two independent springs in the same plane, disposed respectively inside of the two opposite side rails of the frame, each spring being composed of a single integral leaf which is substantially triangular when viewed in the direction of the flexure, the spring extending in the longitudinal direction of the vehicle, the base and the apex of each leaf constituting its attaching ends, one end being secured to the crossbar of the frame and the other end being secured to one of the axles.

4. A spring suspension for vehicles comprising two independent single leaf springs in the same plane, each of which is substantially triangular when viewed in the direction of the flexure, one end of each being secured to the frame of the vehicle, and the other end of each being secured to one of the axles, the apex and the base of each spring constituting the attaching ends.

5. A spring suspension for vehicles comprising two independent leaf springs in the same plane, each composed of a single integral leaf of triangular form when viewed in the direction of the flexure, one end of each being secured to the frame of the vehicle and the other end of each being secured to one of the axles, each spring extending in the longitudinal direction of the vehicle, the apex and the base of each spring constituting the attaching ends, the two springs being on opposite sides of the middle of the vehicle and secured to opposite sides of the frame and to opposite ends of the axle.

In testimony whereof I affix my signature.

ALBERT E. FREY.